US009452502B1

(12) United States Patent
Jones

(10) Patent No.: US 9,452,502 B1
(45) Date of Patent: Sep. 27, 2016

(54) METHOD AND APPARATUS FOR REWORKING APERTURES IN A WORKPIECE WITH CHIP COLLECTION

(71) Applicant: The Boeing Company, Chicago, IL (US)

(72) Inventor: Gary Eugene Jones, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 234 days.

(21) Appl. No.: 13/928,021

(22) Filed: Jun. 26, 2013

(51) Int. Cl.
*B23Q 11/00* (2006.01)
*B23B 47/34* (2006.01)

(52) U.S. Cl.
CPC ......... *B23Q 11/0046* (2013.01); *B23B 47/34* (2013.01); *B23Q 11/0075* (2013.01); *B23B 2260/058* (2013.01); *B23B 2270/30* (2013.01); *B23B 2270/62* (2013.01); *B23Q 11/0071* (2013.01)

(58) Field of Classification Search
CPC ......... B23B 2270/62; B23B 2270/30; B23B 2260/058; B23B 47/34; B23Q 11/0046; B23Q 11/0071; Y10T 279/3487; Y10T 279/17821
USPC ................................................ 279/156, 83
See application file for complete search history.

(56) References Cited

U.S. PATENT DOCUMENTS

| 2,829,544 | A | * | 4/1958 | Bergstrom | 408/225 |
| 3,033,298 | A | * | 5/1962 | Johnson | 175/209 |
| 4,208,154 | A | * | 6/1980 | Gundy | 408/204 |
| 4,235,018 | A | * | 11/1980 | Saberg | 33/834 |
| 5,011,342 | A | * | 4/1991 | Hsu | 408/224 |
| 5,662,440 | A | * | 9/1997 | Kikuchi et al. | 409/182 |
| 6,644,898 | B2 | * | 11/2003 | Chu | 408/97 |
| 2007/0264092 | A1 | * | 11/2007 | Kesten | 408/67 |

OTHER PUBLICATIONS

McMaster-Carr catalog page for Anti- Vibration Through-Hole Countersinks.
Noga catalog pages for Deburring System and Countersinks.

* cited by examiner

*Primary Examiner* — Sunil K Singh
*Assistant Examiner* — Yasir Diab
(74) *Attorney, Agent, or Firm* — Kunzler Law Group, PC

(57) ABSTRACT

A tool and a method are provided for processing a workpiece. A housing is provided having a base, an exterior and an interior. A first inlet port is provided on the exterior of the housing and the first inlet port is in fluid communication with the interior of the housing. A first outlet port is provided on the exterior of the housing and the outlet port is in fluid communication with the interior of the housing and the first inlet port. A cutter is rotatably supported within the housing.

14 Claims, 9 Drawing Sheets

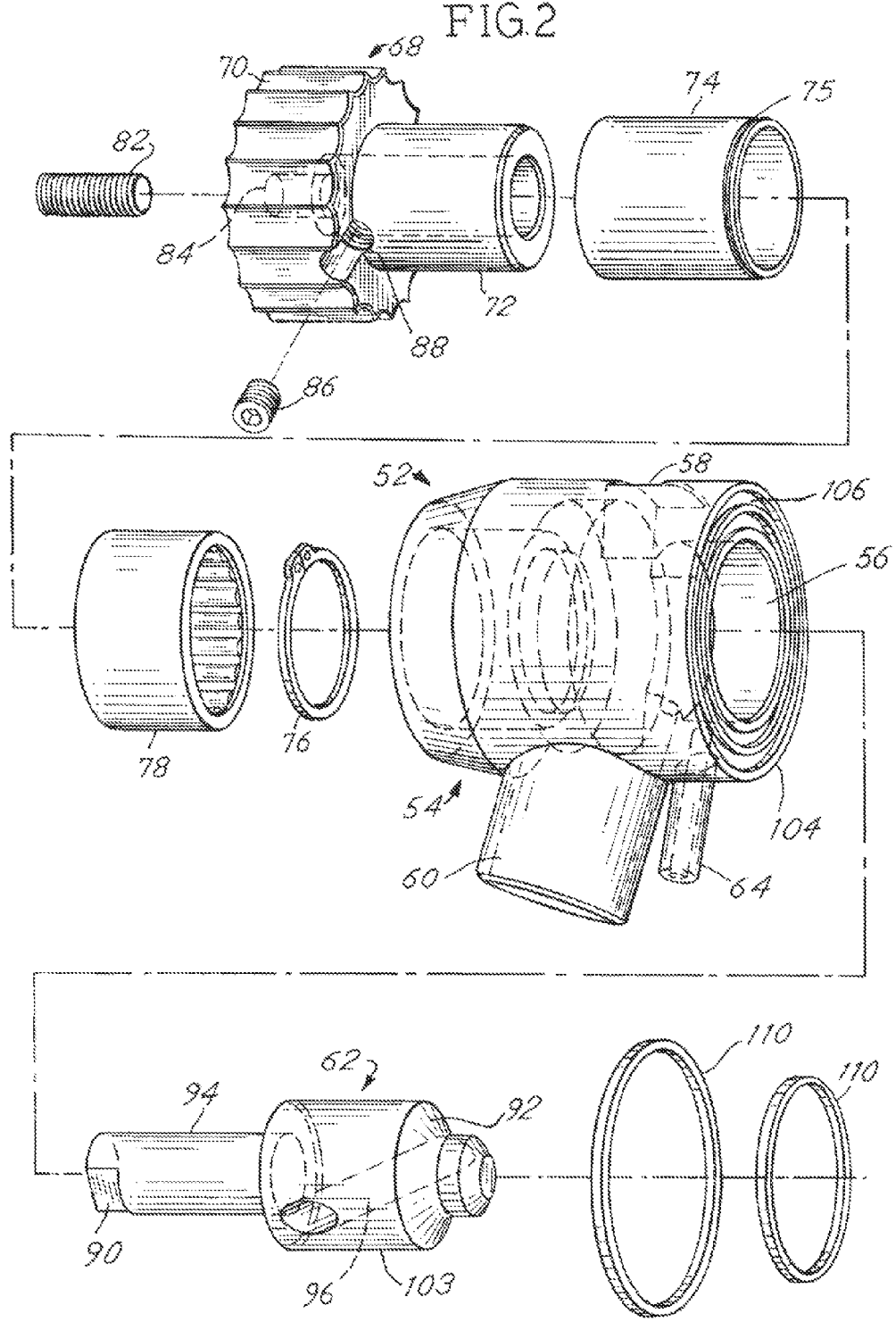

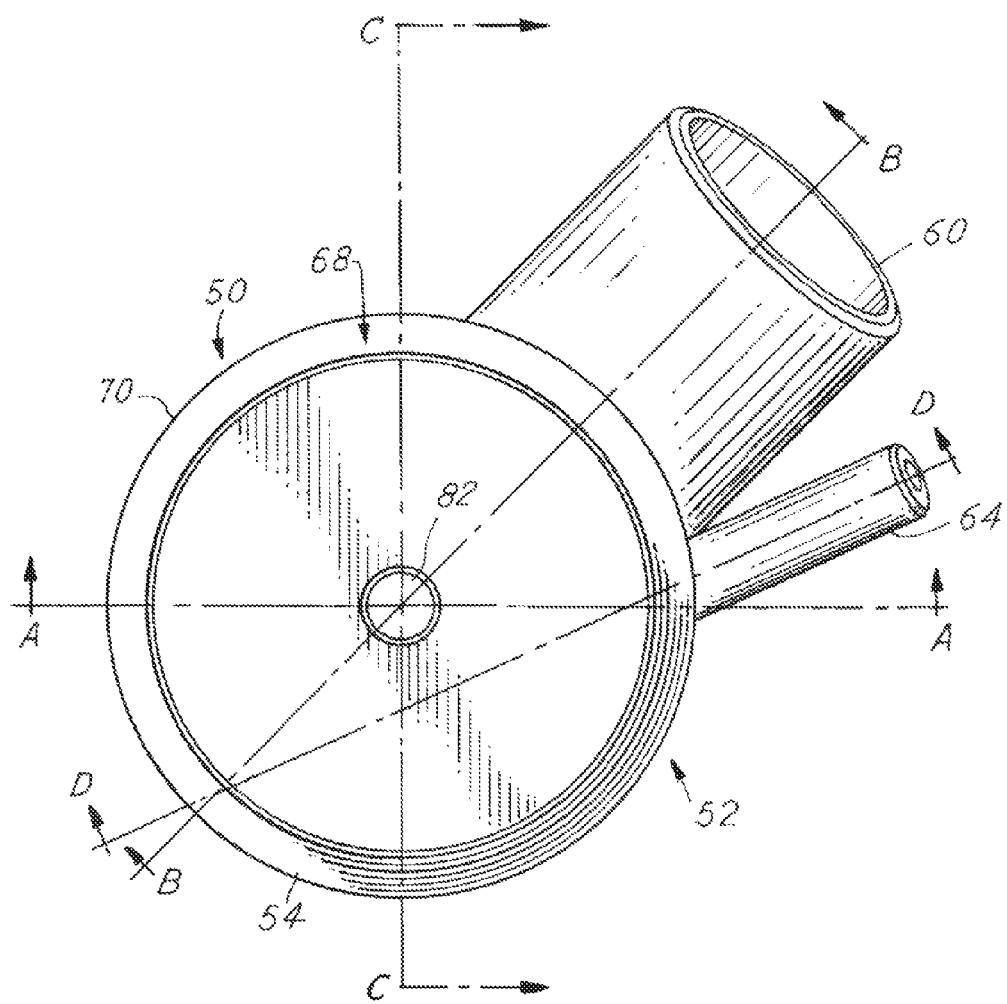

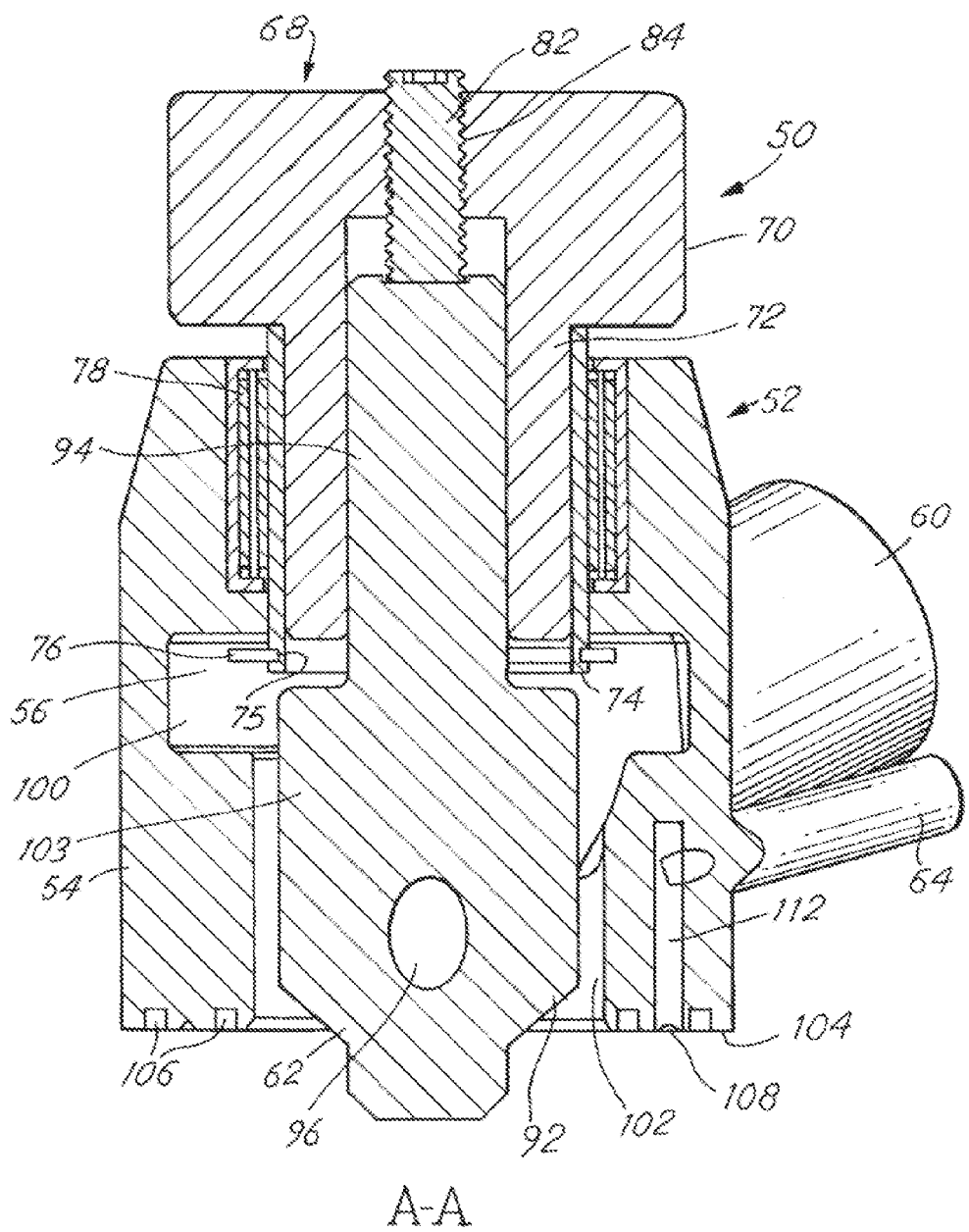

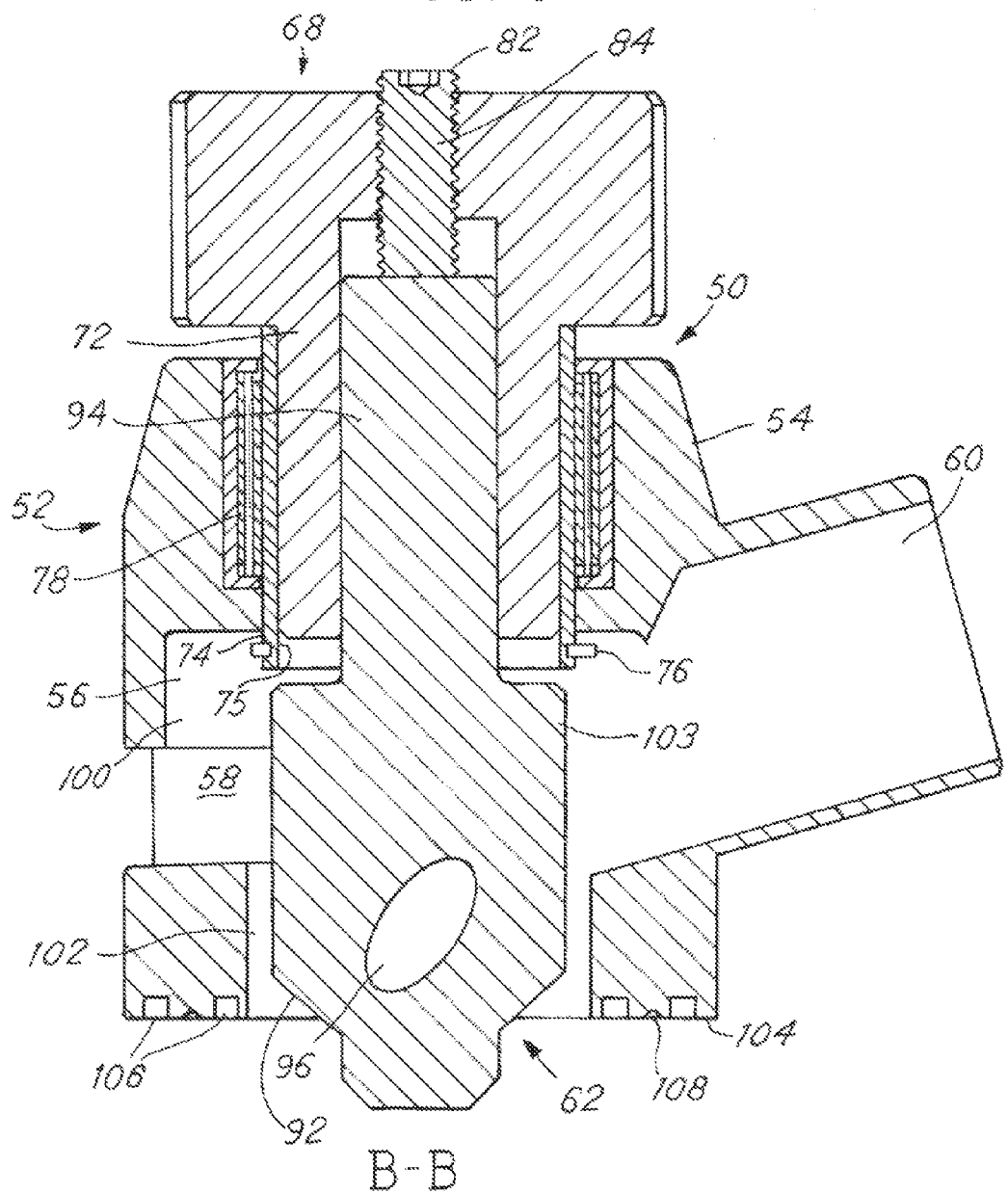

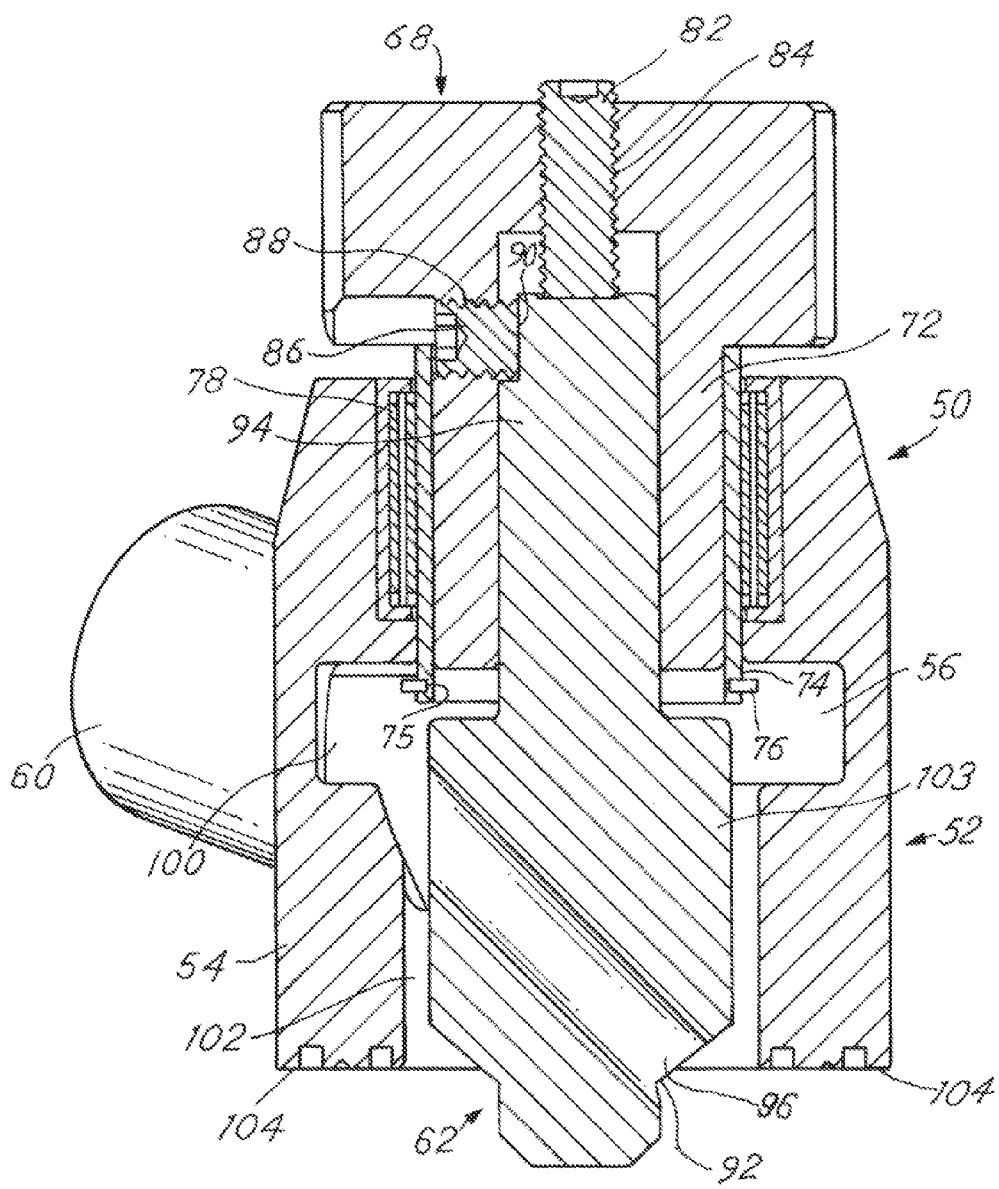

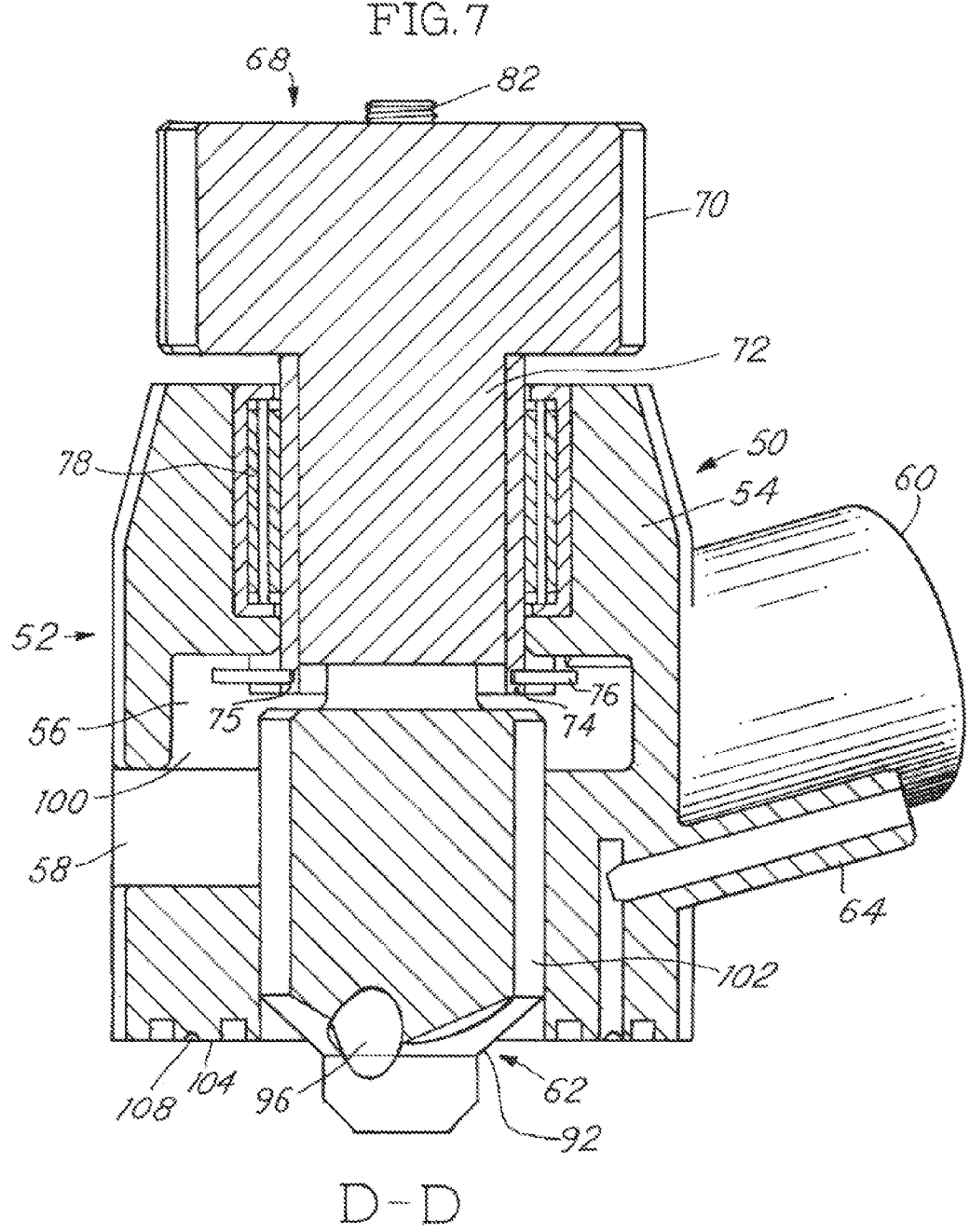

METHOD AND APPARATUS FOR REWORKING APERTURES IN A WORKPIECE WITH CHIP COLLECTION

BACKGROUND

Existing tools for processing, e.g. reworking, holes in aircraft components are bulky, chatter-prone, and generate undesirable foreign-object debris.

BRIEF SUMMARY

Accordingly, an improved tool for processing a workpiece would find utility.

One aspect of the present disclosure relates to a tool for processing a workpiece. The tool includes a housing having a base, an exterior, and an interior. A first inlet port, provided on the exterior of the housing, is in fluid communication with the interior of the housing. An outlet port on the exterior of the housing is in fluid communication with the interior of the housing and with the first inlet port. An air- and debris entry passage is bounded by the base of the housing and is in fluid communication with the interior of the housing. A cutter is rotatably supported in the housing.

Another aspect of the present disclosure relates to a tool for operating on a workpiece wherein debris results from operating the tool on the workpiece. The tool includes a housing, having a wall, and a central open portion, surrounded by the wall. The central open portion has first and second ends. An air-entry port and an air-and-debris exit port are provided in the wall of the housing. A rotatable member is located within the central open portion of the housing. The rotatable member includes a first end section in close proximity to the first end of the central open portion of the housing. The rotatable member also includes a second end section in close proximity to the second end of the central open portion. An operating tool is provided on the second end section of the rotatable member in close proximity to the second end of the central open portion. A drive member is fixed on the first end portion of the rotatable member in close proximity to the first end of the open central portion. The drive member rotates the rotatable member and the operating tool portion while the operating tool portion is operating on the workpiece. An air-and-debris and chip-entry passage is provided proximate to the operating tool portion. An inner chamber is provided between the housing and the rotatable member. The chamber is in communication with the air-entry port, with the air-and-debris entry passage, and with the air-and-debris exit port.

Still another aspect of the present disclosure relates to a method for processing a workpiece and removing processing debris therefrom. The method includes locating a cutter, rotatably supported in a housing, relative to the workpiece. The housing includes an exterior, an interior, a base, an inlet port, an outlet port, and an air-and-debris entry passage bounded by the base of the housing and in fluid communication with the interior of the housing. The cutter includes a through opening. The method also includes adjusting the distance of the cutter relative to the workpiece by changing the position of the cutter relative to the housing. A fluid seal is provided between the base of the housing and the workpiece. A vacuum is applied to the outlet port on the exterior of the housing. The outlet port is in fluid communication with the air-and-debris entry passage, the interior of the housing, the through opening in the cutter, and an inlet port on the exterior of the housing. The cutter is rotated to process the workpiece. The processing debris received in the air-and-debris entry passage and the through opening in the cutter is removed via the outlet port, which is in fluid communication with the through opening in the cutter, the interior of the housing and the air inlet port.

Yet another aspect of the present disclosure relates to a method for operating on a workpiece wherein the debris results from operating on the workpiece. A tool is provided with a housing having a wall portion and an inner surrounded by the wall portion. An air entry port and an air-and-debris exit port are provided in the wall portion. A vacuum source is provided at the air-and-debris exit port. A rotatable member, having a first end and a second end, is mounted in the interior. A tool portion is fixedly mounted on the first end of the rotatable member for operating on the workpiece. A drive member is provided for rotating the rotatable member and the tool portion for operating on the workpiece and creating debris intermixed with air. A passage is provided for collecting intermixed air and debris at the tool portion. An inner chamber is provided between the housing and the rotatable member. The inner chamber communicates with the air entry port, the intermixed air-and-debris passage, and the air-and-debris exit port. Air and debris are removed from the chamber with the vacuum thereby removing air and debris from the chamber through the air and debris exit port.

The features, functions, and advantages that have been discussed can be achieved independently in various embodiments or may be combined in yet other embodiments, further details of which can be seen with reference to the following description and drawings.

BRIEF DESCRIPTION OF SEVERAL VIEWS OF THE DRAWINGS

FIG. 2 is an exploded view of the tool of FIG. 1;

FIG. 3 is a top elevation view of the tool of FIG. 1;

FIG. 4 is a sectional view of the tool taken along the line A-A of FIG. 3;

FIG. 5 is a sectional view of the tool taken along the line B-B of FIG. 3;

FIG. 6 is a sectional view of the tool taken along the line C-C of FIG. 3;

FIG. 7 is a sectional view of the tool taken along the line D-D of FIG. 3;

DETAILED DESCRIPTION

Figure 9:
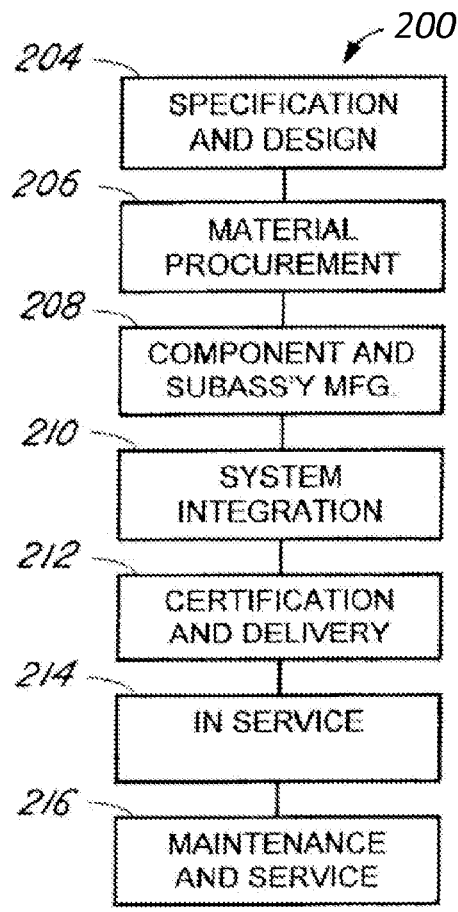
FIG. 9 is a flow diagram of aircraft production and service methodology.
Figure 10:
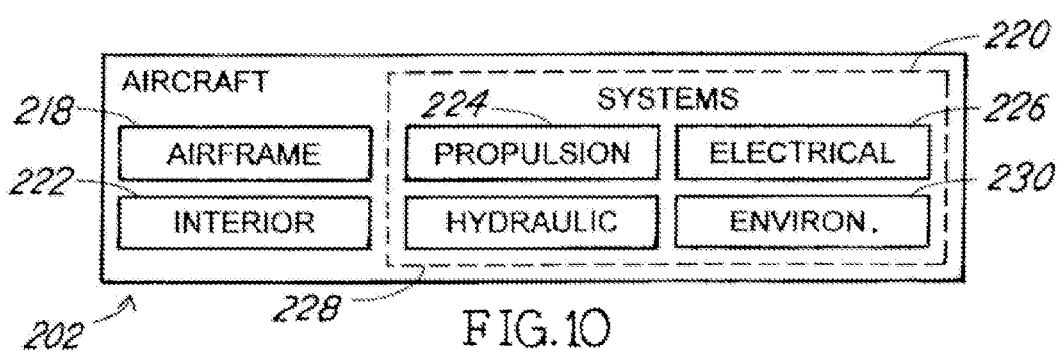
FIG. 10 is a block diagram of an aircraft.

Referring more particularly to the drawings, embodiments of the disclosure may be described in the context of an aircraft manufacturing and service method 200 as shown in FIG. 9 and an aircraft 202 as shown in FIG. 10. During pre-production, exemplary method 200 may include specification and design 204 of the aircraft 202 and material procurement 206. During production, component and subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 202 produced by exemplary method 200 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the invention may be applied to other industries, such as the automotive industry.

Apparatus and methods embodied herein may be employed during any one or more of the stages of the production and service method 200. For example, components or subassemblies corresponding to production process 208 may be fabricated or manufactured in a manner similar to components or subassemblies produced while the aircraft 202 is in service. Also, one or more apparatus embodiments, method embodiments, or a combination thereof may be utilized during the production stages 208 and 210, for example, by substantially expediting assembly of or reducing the cost of an aircraft 202. Similarly, one or more of apparatus embodiments, method embodiments, or a combination thereof may be utilized while the aircraft 202 is in service, for example and without limitation, to maintenance and service 216.

In the following description, the aspects of the disclosure may, at times, be described in the context of manufacturing, servicing or maintaining components of an aircraft. It is to be understood that aspects of the present disclosure are useful in a wide range of industries outside of the aircraft industry.

Figure 1:
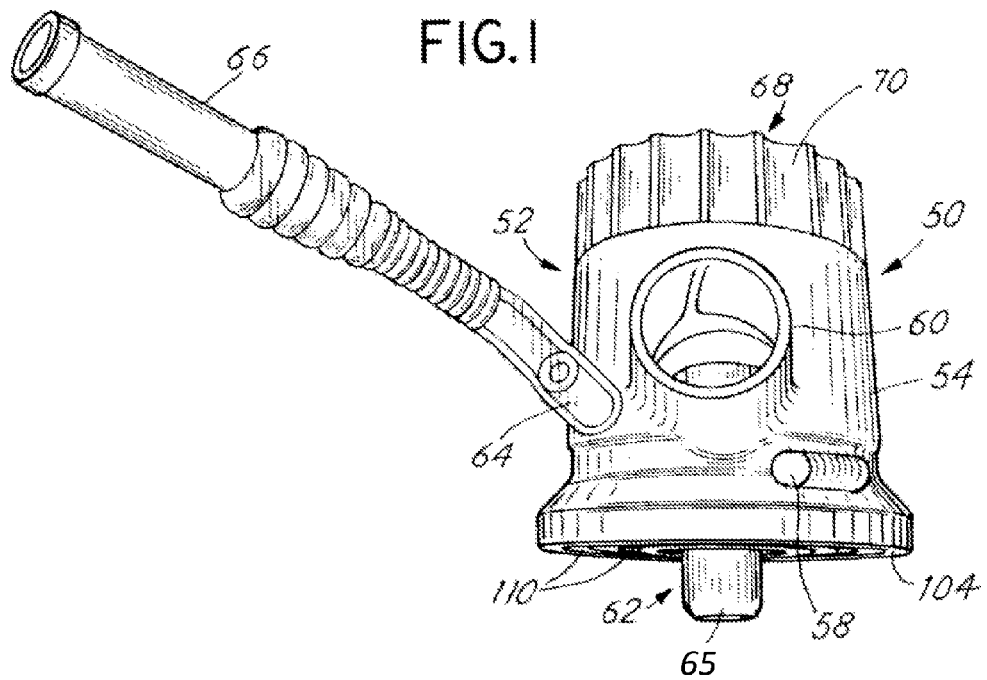
FIG. 1 is a perspective view of a tool for processing a workpiece according to one aspect of the disclosure.
Figure 1A:
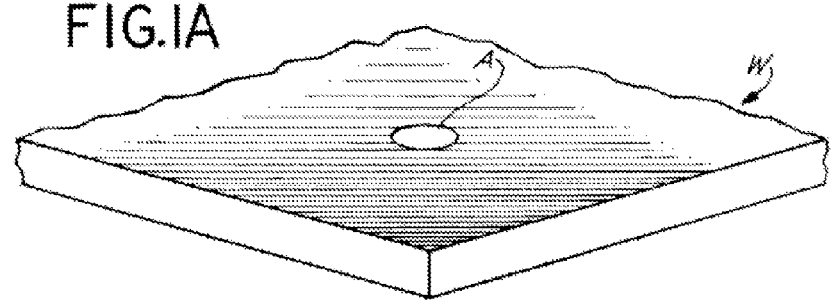
FIG. 1A is a view showing a workpiece having an opening therein which may be reworked by the tool illustrated in FIG. 1.

FIG. 1 illustrates a tool, generally 50, according to one aspect of the present disclosure. FIG. 1A shows a workpiece W. also in pictorial view. The tool 50 is useful, for example, for reworking an aperture A in the workpiece W Referring to FIG. 2, the tool 50 includes a housing 52. The housing 52 may include a wall 54, which may be cylinder shaped, and an open interior 56 (see FIG. 2), surrounded by the wall 54. An air inlet or an air entry port 58 may be provided, e.g., in the lower portion of the wall 54 of the housing 52. The air inlet port 58 provides fluid communication between the outer atmospheric air and the interior 56 of the housing 52. An outlet or an air-and-debris exit port 60 is provided and is preferably unitary with the wall 54 of the housing 52. In one aspect of the disclosure, the outlet port 60 is tubular and extends outwardly from the housing 52. The outlet port 60 is in fluid communication with the interior 56 of the housing 52 and also with the air inlet port 58.

Referring to FIG. 2, a tool, such as a cutter, generally 62, is rotatably mounted within the interior 56 of the housing 52. One useful cutter 62 is a countersink (such as Part No. 2739A73 available from McMaster Carr, Elmhurst, Ill.). The cutter 62 is preferably made of hardened steel.

Referring to FIGS. 1 and 2, a port 64 is unitary with the wall 54 of the housing 52. In one aspect, the port 64 projects outwardly from the housing 52. A vacuum line 66, preferably flexible, is attached to the port 64 and is connected to a vacuum source shown in FIG. 8.

Referring to FIG. 1 and FIG. 2, the tool 50 includes a drive member 68, which is fixedly or non-rotatably secured to the cutter 62. The drive member 68 includes a gripping portion 70, which may be vertically ridged for ease of manual rotation of the cutter 62 relative to the housing 52 in clockwise and counterclockwise directions.

The details of the internal structure of the tool 50, according to one or more aspects of the disclosure will be described with reference to FIGS. 2-7. The drive member 68 includes a unitary cylindrical portion 72 of reduced diameter relative to the gripping portion 70. Referring to FIG. 2 and also to FIG. 5, the drive member 68 has a metal sleeve 74, fixed on the cylindrical portion 72 of the drive member 68. The sleeve 74, at its lower portion, has a groove 75 which receives a snap ring 76, as best seen in FIGS. 2 and 5. A bearing 78, as best seen in FIGS. 2, 4 and 5, is mounted within the interior 56 of the housing 52 and, more specifically, within the upper portion of the housing 52 at its upper portion. The sleeve 74 and bearing 78 provide for rotatable support for the drive member 68 relative to the housing 52.

Referring to FIGS. 2 and 5, an adjusting screw 82 is mounted along the central axis of the cutter 62, of the housing 52, and of the drive member 68. The adjusting screw 82 is secured within a threaded opening 84 in the upper surface of the drive member 68. Adjustment of the adjusting screw 82 provides for selective up and down movement of the cutter 62 for setting the relative vertical position of the cutter 62 to the housing 52. A set screw 86 is received within a lateral threaded opening 88, provided in the drive member 68. The set screw 86 bears against a flat surface 90 on the rotatable cutter 62 at the upper end of the cutter, configured for non-rotatably interconnecting the drive member 68 to the cutter 62. The cutter 62 is rotated for processing the workpiece W by rotation of the drive member 68. The adjustable set screw 86 is adjusted away from the flat 90 of the cutter 62 when the screw 82 is used to adjust the relative vertical position of the cutter 62 to the housing. After the desired vertical position of the cutter 62 has been achieved using the adjusting screw 82, the set screw 86 is tightened against the flat surface 90 of the cutter 62.

Referring to FIGS. 2, 4 and 6, the cutter 62 has a cutter portion 92 at the lower end of the cutter. The cutter 62 is only one type and other cutter tools may be used. The cutter 62 includes an upper reduced-diameter shaft 94 that is slidably received within the cylindrical portion 72 of the drive member 68. The cutter 62 is moveable downwardly and upwardly within the cylindrical portion 72 of the drive member 68 when the set screw 86 is not engaging the flat surface 90. As seen in FIG. 6, an oblique through opening 96 is provided in the shaft 94 of the cutter 62. The through opening 96 extends from the cutter portion 92 of the cutter 62 to the upper portion of the interior 56 of the housing 52.

A chamber 100 is formed between the wall 54 of the housing 52 and the cutter 62. The through opening 96 terminates at the chamber 100. In addition, an annular channel 102 is formed between an enlarged lower end 103 of the cutter 62 and the inner surface of the wall 54 of the housing 52 and acts as an air-and-debris entry passage in close proximity to the cutter portion 92.

As shown best in FIGS. 4-7, the chamber 100 is in fluid communication with the atmosphere through the air inlet port 58 (see FIG. 7), with the vacuum source through the outlet port 60, with the through opening 96 of the cutter 62, and with the annular channel 102. The tool 50 controls the passage and collection of debris and chips that result from the processing (e.g., reworking) by the tool 50 of the aperture A in the workpiece W and avoids the entry of debris and chips into the surrounding environment in a manner to be described herein.

Referring to FIGS. 2 and 4, the wall 54 of the housing 52 has a lower annular surface or base 104. The base 104 includes grooves, e.g., first and second laterally spaced, square-cross-section annular grooves 106. A circular slot 108 is provided in the base 104 between the annular grooves 106. Laterally spaced square-cross-section annular seals 110, as seen best in FIG. 2, are received in the grooves 106. The seals 110 are spaced from each other and have different size diameters.

As seen in FIG. 4, a channel, e.g. an upright channel 112 extends upwardly from the slot 108 and intersects the port 64. The slot 108 is in communication through the channel 112 with the vacuum provided at the port 64. When the tool 50 is operating on a flat workpiece W (FIG. 1A), a vacuum is formed between the base 104 and the workpiece W in the slot 108. The vacuum is drawn through the port 64 and into the slot 108 in the base 104 of the housing 52. In this way, the tool 50 is held in place against the planar surface of the workpiece W by the vacuum in the slot 108 allowing the operator to concentrate on processing the workpiece W.

Operation of Tool

In the operation of the tool 50 for illustrative purposes, the tool 50 will be described when the tool is used to rework an aperture A in the workpiece W with a chamfering cutter 62. The first step is the operator loosens the lateral set screw 86 relative to the flat surface 90 on the shaft 94 of the cutter 62. Then the adjusting screw 82 in the top of the drive member 68 is moved up or down to adjust the working height of the cutter portion 92 to properly position the working height of the cutter portion 92 relative to the housing 52 and the workpiece W. By moving the adjusting screw 82 downwardly, the cutter portion 92 is moved downwardly relative to the base 104 of the housing 52. By reversing the direction of the adjusting screw 82, downward pressure on the tool 50 will cause the cutter portion 92 to move upwardly relative to the base 104. The set screw 86 is then retightened against the flat surface 90 to again secure the drive member 68 and cutter 62 together.

Figure 8:
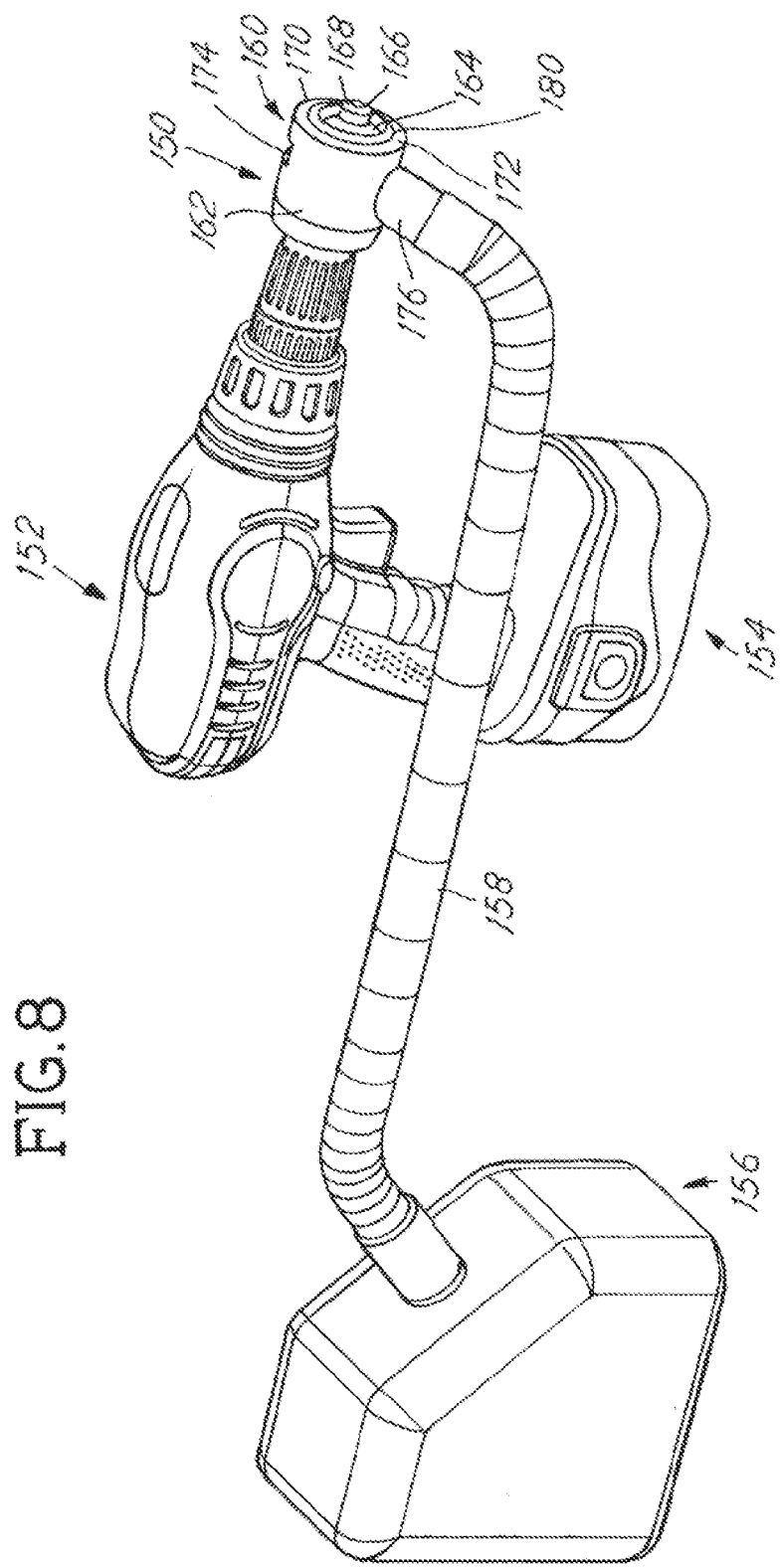
FIG. 8 is a perspective view of a tool for processing a workpiece in accordance with another aspect of the disclosure.

The next step involves positioning the tool 50 against the workpiece W using a locating protrusion 65 extending from the cutter portion 92 of the cutter 62. In the case of a generally flat workpiece W, the cutter portion 92 reworks the aperture A in the workpiece W. A vacuum is applied to the vacuum port 64, and a vacuum is drawn through the upright channel 112 and into the slot 108 in the base 104. With the seals 110 and the workpiece W enclosing the slot 108 from the atmosphere, the vacuum in the enclosed slot 108 holds the tool 50 against the flat workpiece W. If a flat workpiece is not being processed, an alternate tool is shown in FIG. 8 and will be described.

With the tool 50 in place, the tool 50 is manually operated. The operator rotates the drive member 68 in a clockwise or counterclockwise direction to rotate the cutter 62 and process the aperture A in the workpiece W using the sharp edges of the through opening 96. A vacuum is applied to the outlet port 60 in the wall 54 of the housing 52. The outlet port 60 is in communication with the inner chamber 100. The air inlet port 58 in the wall 54 of the housing 52 enables air at atmospheric pressure to be drawn by vacuum into the chamber 100. The vacuum collects debris and chips caused by operation of the cutter 62 processing the workpiece W. The debris or chips resulting from the rotation of the cutter 62 are drawn upwardly through the annular channel 102 as well as through the through opening 96 in the cutter 62. Intermixed air and debris and/or chips are drawn upwardly into the chamber 100 and mixed with air entering through the inlet port 58 by the vacuum. A collection container, e.g., chip collector 156, as seen in FIG. 8, is connected to the vacuum outlet port 60. The debris and/or chips formed by the cutter 62 do not enter the surrounding atmosphere as they are drawn by the vacuum through the outlet port 60 and are collected in a collection container.

The manually operated tool 50 has a further advantage of selectively avoiding the generation of sparking because of the slow rotary speed of manual operation. It is to be understood that the operation of the tool 50 may be automated and that the tool may be operated at higher speeds by a pneumatic or electric drive motor. One such alternate power tool is described below.

Alternate Power Tool

As illustrated in FIG. 8, an alternate power driven tool 150 is driven by an operatively interconnected rotary power drive 152. The power drive 152 is secured to a rotary drive member (not shown in FIG. 8 but equivalent to the drive member 68 of the tool 50) such as by a chuck 153 provided on the drive 152. The drive 152 may be a hand-held power tool, such as a power drill. The drive 152 is powered by a connection to an electrical power line or by a connection to a battery. In the example shown, a battery pack 154 is operatively connected to the drive 152. FIG. 8 illustrates a vacuum pump/debris and chip collector 156, which is interconnected to the interior of the tool 150 by a vacuum line 158.

The tool 150 shown in FIG. 8 is substantially equivalent to the tool 50 as described with reference to FIGS. 1-7 with respect to structure and operation. The differences will be described below. As already described, the tool 50 is manually operated and the tool 150 is power operated. Related to the operational difference is that the drive member (not shown) of the tool 150 is modified to operatively receive a portion of the chuck 153 of the power drive 152. Another difference is that the tool 150 does not use a vacuum system of the type used by the tool 50 for holding the tool against a flat workpiece. Manual force from the operator on the tool 150 is used to hold the tool 150 against the workpiece.

The tool 150 has a housing 160 that has a wall 162. An interior 164 is enclosed by the housing 160. A cutter 166 is rotatably mounted in the interior 164. A cutter portion 168 is shown in an operative position at a base 170 of the housing 160. The base 170 is annular and the outer surface has a selected shape, such as a convex and spherical shape and is designed to operate against various surfaces of a workpiece. An inner chamber (not shown) is provided in the interior of the housing 160 and is equivalent to the chamber 100 of the tool 50. An atmosphere entry port 174 is provided in the exterior wall 162 and is in fluid communication with the inner chamber. An air and debris exit port 176 is open to the inner chamber.

The power drive 152 enables the operator to apply manual force on the tool 150 to hold the base 170, having a selected shape, and mates with the workpiece having a matching selected shape to prevent the escape of debris and chips into the surrounding area of use. Vacuum from the vacuum pump/collector 156 collects the debris and chips from operation of the cutter portion 168 on the workpiece. The inner chamber is in fluid communication with the atmosphere through the inlet port 174 and with the exit port 176. The collected debris and chips travel through the through passage (not shown) in the cutter 166 and through the annular channel (not shown), formed between the cutter 166 and the housing 160.

While the disclosure has been described with reference to certain examples, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all examples falling within the scope of the appended claims.

What is claimed is:

1. A tool for processing a workpiece, the tool comprising:
a housing including a base, an exterior, and an interior;
a first inlet port on the exterior of the housing, wherein the first inlet port is in fluid communication with the interior of the housing;
an outlet port on the exterior of the housing, wherein the outlet port is in fluid communication with the interior of the housing and the first inlet port;
an entry passage bounded by the base of the housing and in fluid communication with the interior of the housing;
a cutter having a rotational axis, wherein the cutter is rotatably supported in the housing;
a drive member fixed to the cutter and configured to rotate the cutter; and
a bearing in the housing for rotationally coupling the drive member to the housing;
wherein:
the cutter includes a through opening,
the through opening is in fluid communication with the inlet port, the interior of the housing, and the outlet port, and
the through opening is a circumferentially enclosed opening further including a first annular seal and a second annular seal in the base of the housing, wherein the first annular seal has a different diameter then the second annular seal, further including an annular slot between the first annular seal and the second annular seal and a port to the annular slot, the port being connected to a vacuum source.

2. The tool of claim 1 wherein the base of the housing has a selected shape that mates with the workpiece having a matching selected shape.

3. The tool of claim 1 wherein the cutter is manually rotatable.

4. The tool of claim 1 wherein the cutter is rotatable by a power drive.

5. The tool of claim 1 wherein the through opening is oblique relative to the rotational axis of the cutter.

6. The tool of claim 1 wherein the cutter has a position relative to the base and wherein the position is adjustable.

7. The tool of claim 1 wherein the interior of the housing includes an annular channel between the cutter and a wall of the housing, wherein the annular channel is in fluid communication with the outlet port.

8. The tool of claim 1 further including a height adjusting member for adjusting the height of the cutter relative to the housing, the height adjusting member comprising an adjusting screw mounted along the rotational axis of the cutter.

9. The tool of claim 1 wherein the port to the annular slot is formed in the wall of the housing.

10. A method for processing a workpiece and removing processing debris therefrom, the method comprising:
locating a cutter, rotatably supported in a housing, relative to the workpiece, wherein the housing includes an exterior, an interior, a base, an inlet port, and an outlet port, and an entry passage bounded by the base of the housing and in fluid communication with the interior of the housing, and wherein the cutter includes a through cavity;
rotationally coupling the cutter to the housing with a bearing in the housing;
adjusting a distance of the cutter relative to the workpiece by changing a position of the cutter relative to the housing;
providing a seal between the base of the housing and the workpiece wherein the seal is provided by arranging a first annular seal and a second annular seal in the base of the housing such that the first annular seal has a different diameter than the second annular seal, further including an annular slot between the first annular seal and the second annular seal and a port to the annular slot, the port being connected to a vacuum source;
applying a vacuum to the outlet port on the exterior of the housing, wherein the outlet port is in fluid communication with the interior of the housing, the through cavity in the cutter, and the inlet port;
rotating the cutter to process the workpiece; and
removing the processing debris, received in the interior of the housing via the entry passage and the through opening in the cutter, via the outlet port on the housing, wherein the outlet port is in fluid communication with the through cavity in the cutter, the interior of the housing, and the inlet port, and wherein the through opening is a circumferentially enclosed opening.

11. The tool of claim 1, wherein the cutter comprises:
a cutter portion located at a lower end of the cutter and having a cutting edge configured to produce a chamfered surface; and
a locating protrusion extending from the cutter portion and comprising a cylindrical surface.

12. The tool of claim 11, wherein the locating protrusion comprises a leading end and a tapered surface at the leading end of the locating protrusion.

13. The tool of claim 11, wherein the through opening extends into the locating protrusion.

14. The tool of claim 1, wherein the through opening intersects the rotational axis of the cutter.

* * * * *